（12） United States Patent
Oya

(10) Patent No.: US 10,595,060 B2
(45) Date of Patent: Mar. 17, 2020

(54) IMAGE GENERATION APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/903,381

(22) Filed: Feb. 23, 2018

(65) Prior Publication Data
US 2018/0255326 A1 Sep. 6, 2018

(30) Foreign Application Priority Data
Mar. 3, 2017 (JP) ................. 2017-040922

(51) Int. Cl.
H04N 21/2347 (2011.01)
H04N 7/173 (2011.01)
H04N 21/4405 (2011.01)
H04N 21/435 (2011.01)
G06K 9/00 (2006.01)
(Continued)

(52) U.S. Cl.
CPC ..... H04N 21/2347 (2013.01); G06K 9/00778 (2013.01); G06T 11/00 (2013.01); H04N 7/173 (2013.01); H04N 7/188 (2013.01); H04N 21/435 (2013.01); H04N 21/4405 (2013.01)

(58) Field of Classification Search
CPC . G06T 7/194; G06T 7/11; G06T 7/254; G06T 2207/30242; G06T 2207/20081; G06T 11/00; G06K 9/00778; H04N 21/2347; H04N 7/188; H04N 21/435; H04N 21/4405; H04N 7/173
See application file for complete search history.

(56) References Cited

U.S. PATENT DOCUMENTS

2012/0162416 A1* 6/2012 Su .................... H04N 7/185
348/143
2013/0027549 A1  1/2013 Evangelio et al.
(Continued)

FOREIGN PATENT DOCUMENTS

JP  2009-225398 A  10/2009
WO  2012/088136 A1  6/2012

OTHER PUBLICATIONS

A European Search Report issued on Aug. 3, 2018, which is enclosed, that issued in the corresponding European Patent Application No. 18156898.1

Primary Examiner — Kunal Langhnoja
(74) Attorney, Agent, or Firm — Cowan, Liebowitz & Latman, P.C.

(57) ABSTRACT

An image generation apparatus includes: a generation unit that generates an output image in which a foreground mask image overlaps a background image, the foreground mask image having been generated based on a moving object included in an input image; an update unit that executes update processing for updating at least a partial area within the background image based on the input image; and a restricting unit that restricts reflection of the update processing in a restricted area compared to other areas, the restricted area being at least a partial area in the output image.

23 Claims, 11 Drawing Sheets

(51) Int. Cl.
*H04N 7/18* (2006.01)
*G06T 11/00* (2006.01)

(56) References Cited

U.S. PATENT DOCUMENTS

| | | | |
|---|---|---|---|
| 2016/0171332 A1* | 6/2016 | Kawano | G08B 13/19604 382/173 |
| 2018/0033151 A1* | 2/2018 | Matsumoto | G06T 7/20 |

* cited by examiner

IMAGE GENERATION APPARATUS, CONTROL METHOD THEREFOR, AND COMPUTER-READABLE STORAGE MEDIUM

BACKGROUND OF THE INVENTION

Field of the Invention

The present invention relates to an image generation apparatus, a control method therefor, and a computer-readable storage medium, and especially relates to a technique to generate a privacy protection image.

Description of the Related Art

Along with the widespread installation of surveillance cameras, protection of privacy of individuals shown on the video of the surveillance cameras is becoming increasingly important Japanese Patent Laid-Open No. 2009-225398 describes a technique to protect privacy by generating a foreground image and a background image, which respectively represent an image of people and show no people, from an input image, and making an image, resulting from applying mask processing and filter processing to the foreground image, overlap the background image.

Japanese Patent Laid-Open No. 2009-225398 is based on the premise that a background image is generated in a state where there is no person targeted for protection. If a background image is generated from the video of a surveillance camera in a state where a person exists, the background image will include an image of that person. That is to say, the image of that person is distinguished as a background, and is not generated as a foreground image. As a result, the privacy of that person may not be protected. Furthermore, if a person stays motionless for a long time from, for example, sitting on a chair, a person area may be reflected in a background image as time passes. In this case also, that person area is not treated as an area targeted for protection, and the privacy of that person cannot be protected.

SUMMARY OF THE INVENTION

One embodiment of the present invention reduces the failure to protect privacy due to reflection of an image of a person in a background image.

An image generation apparatus according to one aspect of the present invention, there is provided an image generation apparatus, comprising: a generation unit that generates an output image in which a foreground mask image overlaps a background image, the foreground mask image having been generated based on a moving object included in an input image; an update unit that executes update processing for updating at least a partial area within the background image based on the input image; and a restricting unit that restricts reflection of the update processing in a restricted area compared to other areas, the restricted area being at least a partial area in the output image.

According to another aspect of the present invention, there is provided a control method for an image generation apparatus, the control method comprising: generating an output image in which a foreground mask image overlaps a background image, the foreground mask image having been generated based on a moving object included in an input image; executing update processing for updating at least a partial area within the background image based on the input image; and restricting reflection of the update processing in a restricted area compared to other areas, the restricted area being at least a partial area in the output image.

According to another aspect of the present invention, there is provided a computer readable storage medium having stored therein a program for causing a computer to execute a control method for an image generation apparatus, the control method comprising: generating an output image in which a foreground mask image overlaps a background image, the foreground mask image having been generated based on a moving object included in an input image; executing update processing for updating at least a partial area within the background image based on the input image; and restricting reflection of the update processing in a restricted area compared to other areas, the restricted area being at least a partial area in the output image.

Further features of the present invention will become apparent from the following description of exemplary embodiments (with reference to the attached drawings).

DESCRIPTION OF THE EMBODIMENTS

The following describes embodiments is detail with reference to the attached drawings. Note that the configurations presented by the following embodiments are merely examples, and the present invention is not limited to the configurations presented by the embodiments.

<First Embodiment>

According to the present embodiment, in a privacy protection image generation method that silhouettes a detected moving object area and makes it overlap a background image, an area in which moving object detection is difficult is designated in advance. A protection image is prepared in advance by blurring an initial background image in this area, and placed to overlap a background image at the time of generation of a privacy protection image. Thereafter, the privacy protection image is generated by placing a silhouette image through transparent overlap.

Figure 1:
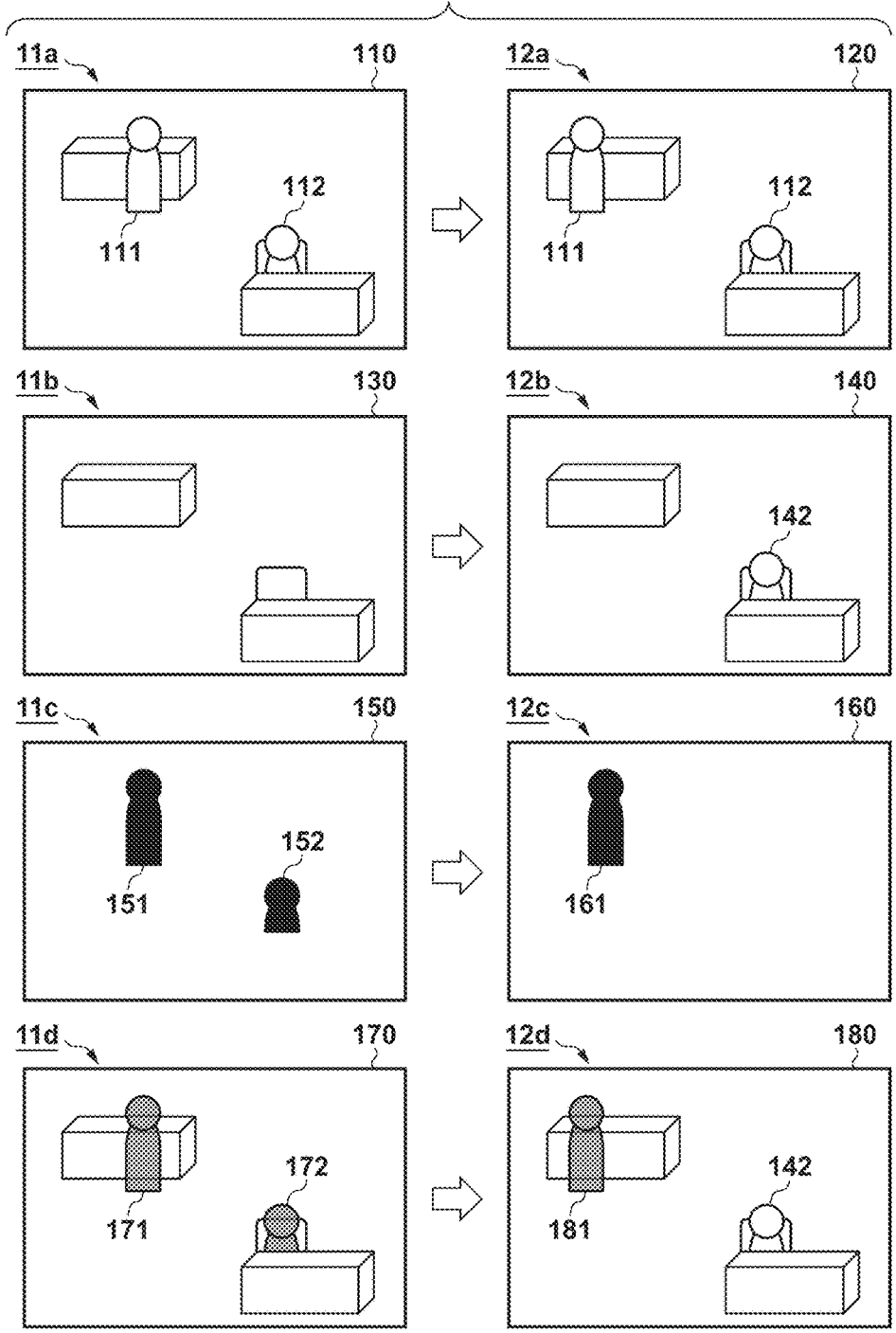
FIG. 1 is a diagram for describing the principle of generation of a privacy protection image.

FIG. 1 a schematic diagram showing the principle of generation of a privacy protection image. 11a, 11b, 11c, and 11d respectively denote an input image 110, a background image 130, a foreground mask image 150, and a privacy protection image 170 that serves as an output image at time t1. Similarly, 12a, 12b, 12c, and 12d respectively denote an input image 120, a background image 140, a foreground mask image 160, and a privacy protection image 180 that serves as an output image at time t2.

A person 111 and a person 112 exist in the input image 110 at time t1 and the input image 120 at time t2. The person 111 moves between the input image 110 (time t1) and the input image 120 (time t2). On the other hand, the person 112 is motionless, and his/her position and orientation are kept substantially the same in the input image 110 and the input image 120.

The background images 130, 140 are generated from a background model that has been generated using a known method based on the input images. The person 111 moves in position between time t1 and time t2, and is distinguished as a moving object. Therefore, an image of the person 111 appears in neither of the background images 130, 140. On the other hand, as the person 112 stays motionless from time t1 to time t2, he/she is distinguished as a background 142 at time t2. That is to say, an object that stays motionless (an object that does not move) over a predetermined period is considered a part of a background, and an image of that object appears in a background image. In other words, the image of that object is reflected in a background image, and determined as a background. This predetermined period until reflection in a background image will be referred to as backgroundization time.

The foreground mask image 150 at time t1 is generated based on the input image 110 and the background image 130. For example, the foreground mask image 150 including foreground masks 151, 152 is obtained by extracting moving object areas through comparison between the input image 110 and the background image 130, and converting the extracted moving object areas into predetermined patterns. In the foreground mask image 160 at time t2, a foreground mask 161 is generated through comparison between the input image 120 and the background image 140. In the foreground mask image 160, a foreground mask corresponding to the person 112 does not exist because the person 112 is a part of the background image 140 as the background 142.

The privacy protection image 170 at time t1 is generated through transparent overlap of the foreground mask image 150 on the background image 130. Therefore, in the privacy protection image 170 at time t1, the person 111 and the person 112 are displayed as silhouetted images 171 and 172, and their privacy is protected. On the other hand, the privacy protection image 180 at time t2 is generated through transparent overlap of the foreground mask image 160 on the background image 140. Therefore, although the person 111 is protected in terms of privacy as he/she is displayed as a silhouetted image 181, the person 112 is not protected in terms of privacy and he/she is displayed as the background 142.

Figure 2:
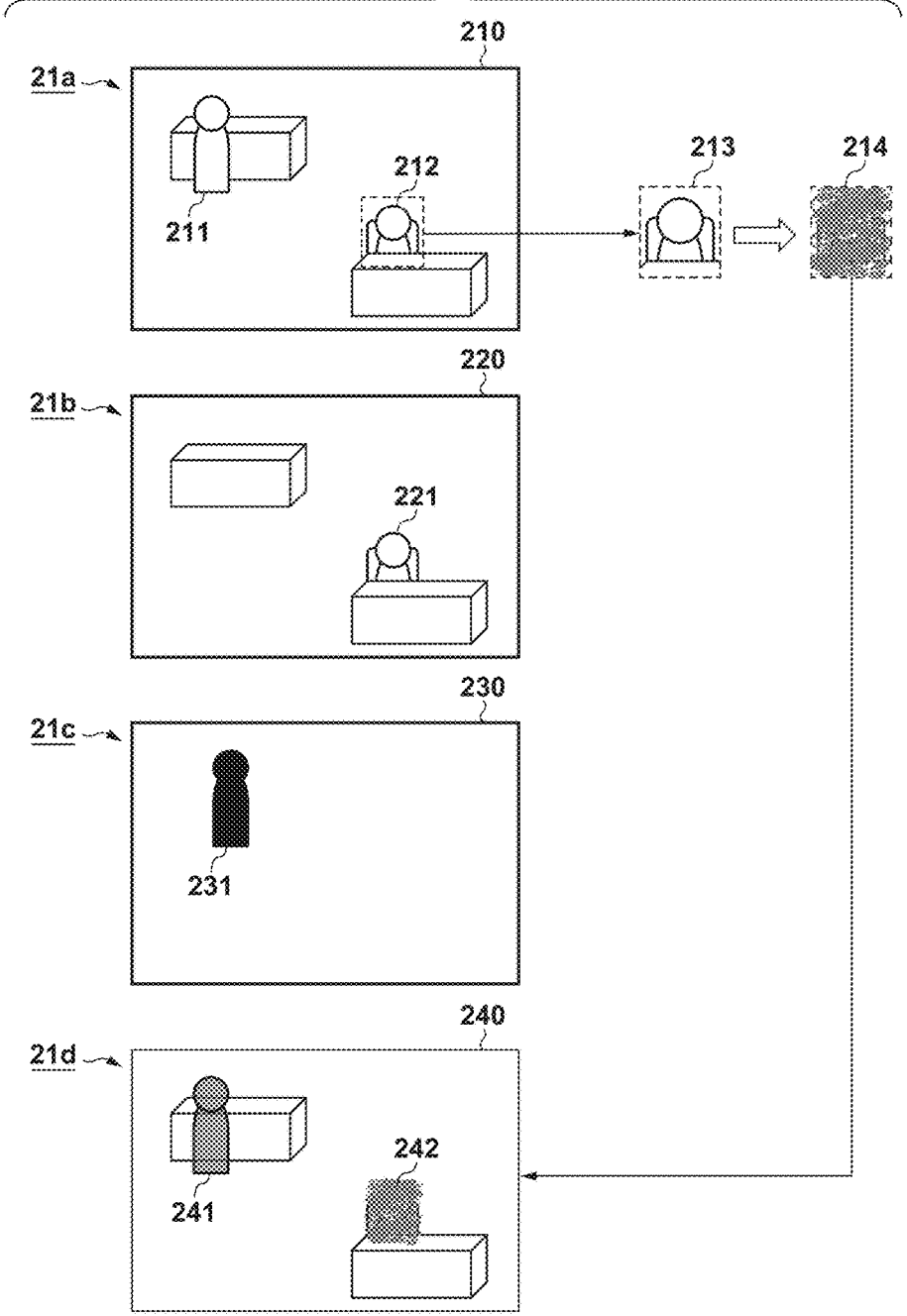
FIG. 2 is a diagram for describing a method for generating a privacy protection image according to a first embodiment.

FIG. 2 is a schematic diagram showing the principle of generation of a privacy protection image according to the present embodiment for solving the foregoing problem (the failure to protect the privacy of the person 112). Similarly to FIGS. 1, 21a, 21b, 21c, and 21d respectively denote an input image 210, a background image 220, a foreground mask image 230, and a privacy protection image 240. A person 211 in the input image 210 moves, and does not appear in the background image 220. As a result, in the foreground mask image 230, a foreground mask 231 corresponding to the person 211 is generated. Therefore, in the privacy protection image 240, the person 211 is displayed as a silhouetted image 241, and his/her privacy is protected.

On the other hand, a person 212 within the input image 210 is assumed to be in a motionless state for a long time (for a period exceeding the backgroundization time) from, for example, sitting on a chair. Note that the motionless state refers to a case where an amount of change in an area is smaller than a predetermined threshold. In this case, an image of the person 212 in the input image 210 is reflected in the background image, and an image 221 of the person 212 appears in the background image 220. A foreground mask of the person 212 not generated in the foreground mask image 230, and the privacy of the person 212 cannot be protected.

In the present embodiment, in order to realize protection of the privacy of the person 212, a background mask image 214 is generated by cutting out a partial area including the person 212 from the input image 210 as a partial image 213. The background mask image 214 is in a state where privacy is protected due to application of blurring or mosaic processing thereto. The privacy protection image 240 is generated through overlap of the background mask image 214, and then transparent overlap of the foreground mask image 230, on the background image 220. As a result, the person 211 is displayed as the silhouetted image 241, and the person 212 is included in a mosaicked image 242. Consequently, both of the person 211 and the person 212 are protected in terms of privacy.

As described above, in a partial area corresponding to the partial image 213 in the privacy protection image 240, reflection of a result of an update of the background image (the image 221 that appears in the background image 220) is restricted. An area in which reflection of an update of the background image is thus reflected will be referred to as a restricted area.

Figure 3:
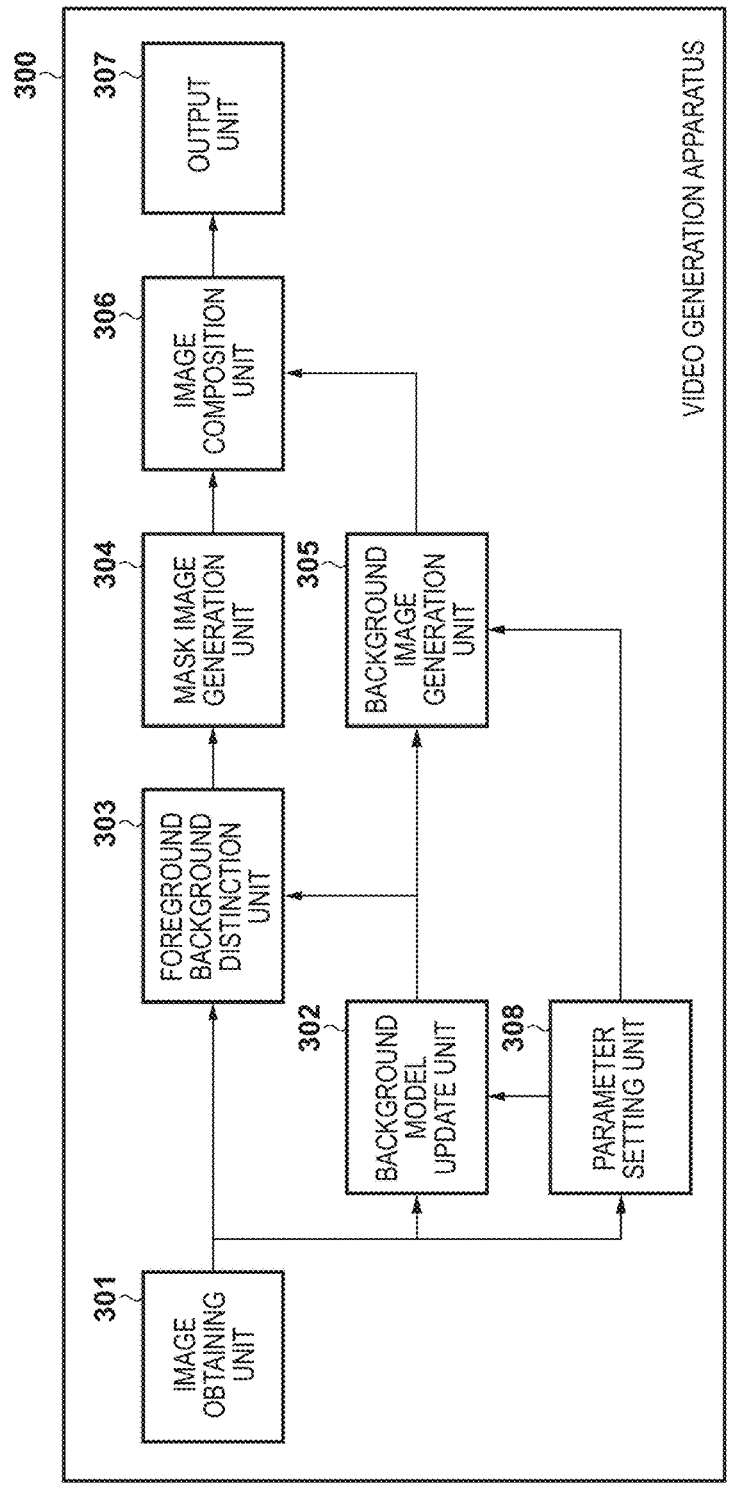
FIG. 3 is a block diagram showing an exemplary functional configuration of a video generation apparatus according to the first embodiment.

FIG. 3 is a block diagram showing an exemplary functional configuration of a video generation apparatus 300 as an image generation apparatus according to the first embodiment. The video generation apparatus 300 includes an image obtaining unit 301, a background model update unit 302, a foreground background distinction unit 303, a mask image generation unit 304, a background image generation unit 305, an image composition unit 306, an output unit 307, and a parameter setting unit 308.

The image obtaining unit 301 obtains a captured image that has been captured by an image capturing apparatus as an input image 210. No limitation is intended regarding a format and a method in which the input image is obtained. For example, the input image may be obtained in any format, such as a still image file, a moving image file, and a streaming image, and a method for obtaining the input image may be of any form using a network, a memory card or other recording mediums, etc. Note that in obtaining a streaming image, a captured image that is currently shot by the image capturing apparatus is obtained. In the case of a still image file and a moving image file, the input image is an image that was shot and stored to a storage apparatus by the image capturing apparatus in the past.

The background model update unit 302 executes update processing for updating a background model based on the input image 210 obtained by the image obtaining unit 301. The foreground background distinction unit 303 distinguishes between a foreground and a background on a per-partial area basis by comparing an immediately preceding input image and the background model. In this distinction processing, image feature amounts of the input image are compared with image feature amounts of the background model. Examples of the image feature amounts to be compared include pixel-by-pixel luminance values and block-by-block frequency components, and some methods incorporate multiple types of image feature amounts. This distinction processing is so-called background subtraction processing, and background subtraction of any method may be used.

The mask image generation unit 304 generates a foreground mask image 230 based on the result of distinction between a foreground and a background by the foreground background distinction unit 303. This is, for example, processing for changing a moving object area (foreground) into a unicolor silhouette. The background image generation unit 305 generates a background image 220 from the background model. Furthermore, the background image generation unit 305 generates a background image in which privacy is protected by making a background mask image 214, which has been generated from the input image 210 by the parameter setting unit 308, overlap the background image 220 generated from the background model. Note that composition of the background mask image 214 may be performed by the image composition unit 306.

The image composition unit 306 generates a privacy protection image through transparent overlap of the foreground mask image, which has been generated by the mask image generation unit 304, on the background image with the overlapping background mask image. Alternatively, it blurs a portion corresponding to the foreground mask area in the input image, and places the portion on the background through transparent overlap. The output unit 307 outputs the privacy protection image generated by the image composition unit 306. Examples of an output method include presentation on a display, storage to a file, and network distribution. However, an output method used by the output unit 307 is not limited to a particular output method. Note that as mentioned earlier, the image composition unit 306 may perform composition of the background mask image. In this case, the image composition unit 306 generates the privacy protection image through transparent overlap of the foreground mask image on the background image (with no overlapping background mask image), and through overlap of the background mask image 214 at a corresponding position.

The parameter setting unit 308 sets parameters for the background model update unit 302 and the background image generation unit 305. Furthermore, the parameter setting unit 308 allows a user to set a restricted area by providing a user interface, which will be described later using FIG. 5 and the like. The parameter setting unit 308 prepares the background mask image 214 by obtaining a partial image 213 corresponding to the set restricted area from the input image 210 and applying blur processing to the obtained partial image. As described earlier, the background image generation unit 305 makes the background mask image 214 overlap the background image 220, or replaces a partial area corresponding to the restricted area in the background image 220 with the background mask image 214.

Figure 11:
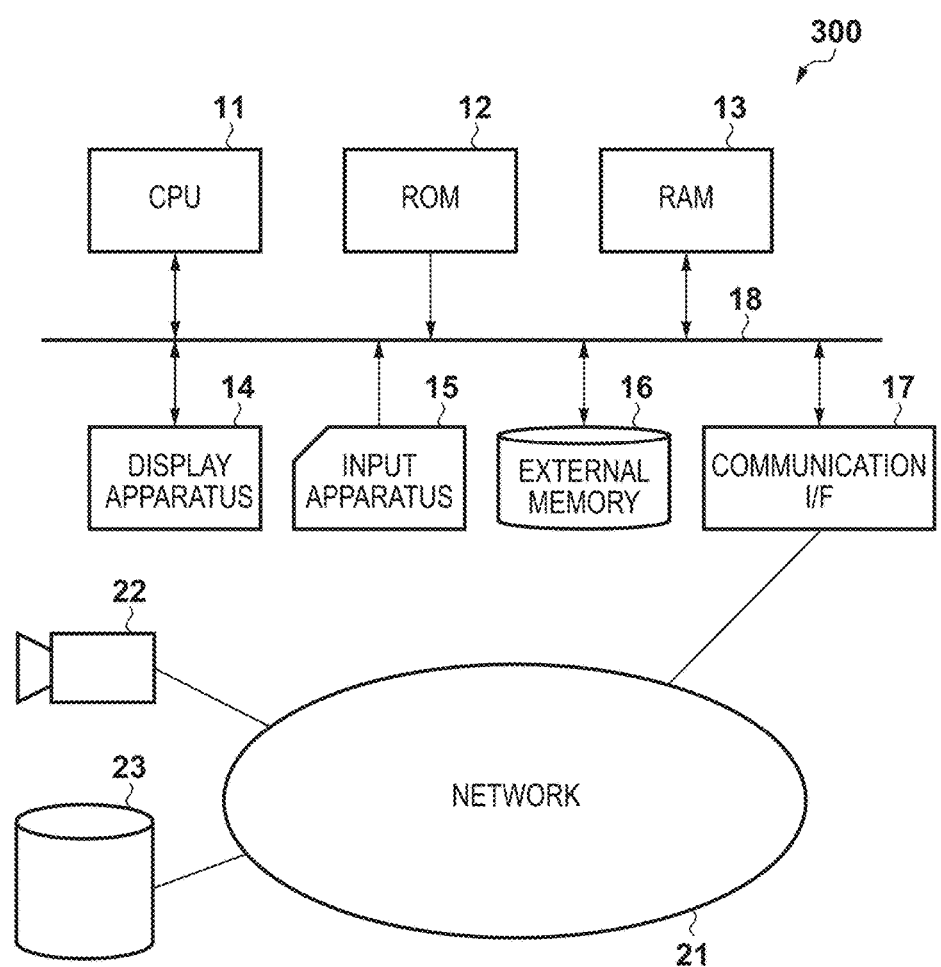
FIG. 11 is a block diagram showing an exemplary hardware configuration of a video generation apparatus.

FIG. 11 is a diagram showing an exemplary hardware configuration of the video generation apparatus 300. The video generation apparatus 300 includes a CPU 11, a ROM 12, a RAM 13, a display apparatus 14, an input apparatus 15, an external memory 16, a communication I/F 17, and a system bus 18.

The CPU 11 integrally controls the operations of the video generation apparatus 300, and controls various components (12 to 17) via the system bus 18. The ROM 12 is a nonvolatile memory that stores control programs and the like that are necessary for the CPU 11 to execute processing. Note that these programs may be stored in the external memory 16 and a removable storage medium. The RAM 13 functions as, for example, a main memory and a working area for the CPU 11. That is to say, the CPU 11 realizes, for example, various types of functional units that have been described earlier using FIG. 3 by, at the time of execution of processing, loading necessary programs and the like from the ROM 12 or the external memory 16 to the RAM 13 and executing these programs and the like.

The display apparatus 14 is, for example, a quid crystal display apparatus, and performs various types of display under control of the CPU 11. For example, the display apparatus 14 displays a setting dialog screen, which will be described later using FIG. 5. The input apparatus 15 inputs a user operation to the video generation apparatus 300. The input apparatus 15 includes a pointing device, such as a mouse. The external memory 16 stores, for example, various types of data and various types of information that are necessary when the CPU 11 executes processing using programs. The external memory 16 also stores, for example, various types of data and various types of information that have been obtained by the CPU 11 executing processing using programs and the like.

The communication I/F 17 is an interface for communicating with an external apparatus. The communication I/F 17 is, for example, a LAN interface. In the present embodiment, the communication I/F 17 connects to a network 21, such as a LAN, and obtains captured images from an image capturing apparatus 22 and a server 23 connected to the network 21. Note that a network camera, for example, is expected to be used as the image capturing apparatus 22. The system bus 18 communicably connects the CPU 11, ROM 12, RAM 13, display apparatus 14, input apparatus 15, external memory 16, and communication I/F 17.

The following describes the operations of the video generation apparatus 300 configured in the above-described manner.

Figure 4:
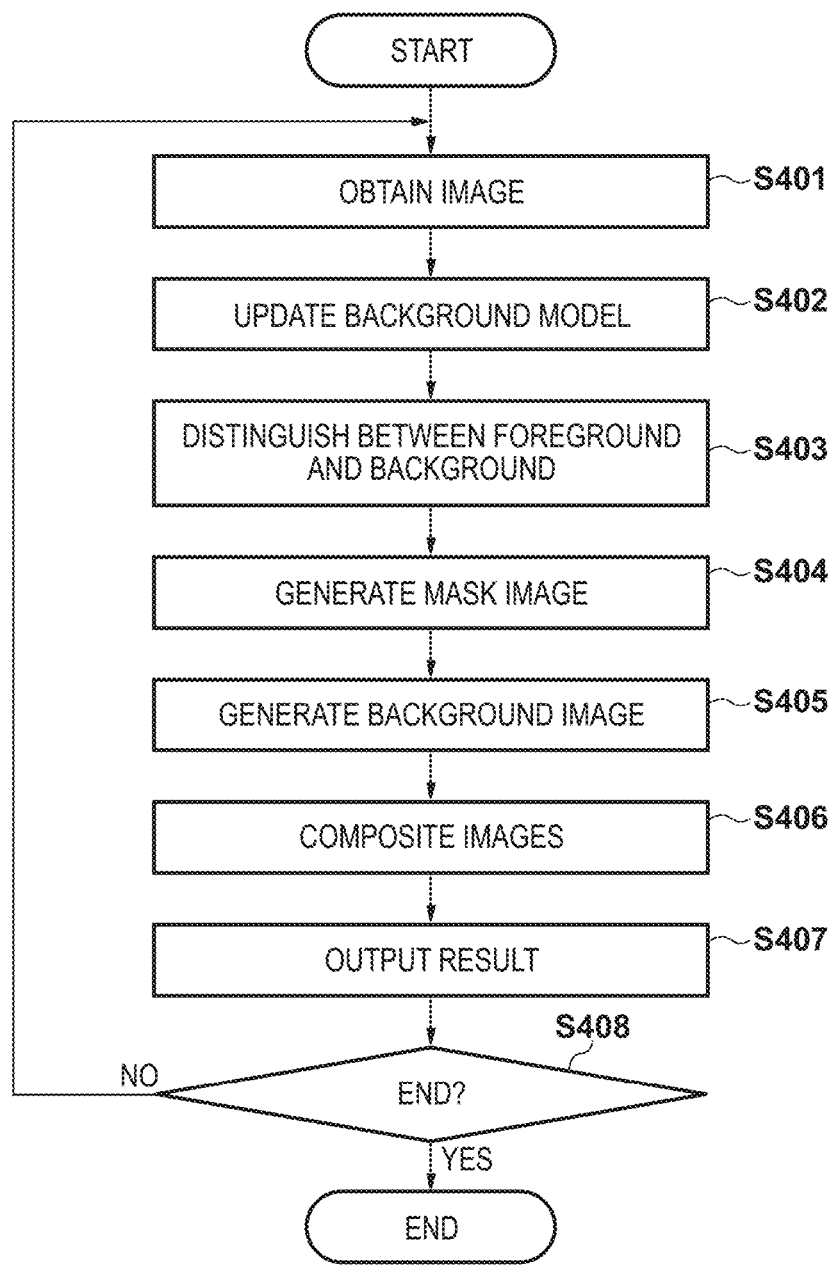
FIG. 4 is a flowchart showing a procedure of processing executed by the video generation apparatus according to the first embodiment.

FIG. 4 is a flowchart showing a procedure for generating a privacy protection image according to the first embodiment. The procedure for generating the privacy protection image will now be described using the flowchart of FIG. 4 and images shown in FIG. 2. First, in step S401, the image obtaining unit 301 obtains an input image 210. Next, in step S402, the background model update unit 302 updates a background model based on the obtained input image 210. Subsequently, in step S403, the foreground background distinction unit 303 distinguishes between a background and a foreground through comparison between feature amounts of the background model and feature amounts of the input image 210. In step S404, the mask image generation unit 304 generates a foreground mask image 230 based on a foreground image that has been obtained as a result of the distinction between the background and the foreground. Furthermore, the parameter setting unit 308 generates a background mask image 214 by cutting out a partial image 213 corresponding to a restricted area from the input image 210 and applying blur processing to the partial image. Note that the generation of the background mask image 214 may be executed any time between the obtainment of the image in step S401 and later-described step S406 (image composition), and may be executed in parallel with steps S402 to S405.

Subsequently, in step S405, the background image generation unit 305 generates a background image 220 from the background model. In step S406, first, the background image generation unit 305 makes the background mask image 214 overlap the background image 220, and then the image composition unit 306 places the foreground mask image 230 on the background image 220 through transparent overlap. Subsequently, in step S407, the output unit 307 outputs the composition result. Next, in step S408, ending of processing is determined; if processing is to be ended, software processing is ended through YES branching. Note that ending of processing is, for example, a user's instruction for stopping shooting. If processing is not to be ended, processing returns to step S401, and the foregoing processing is repeated. It goes without saying that the foregoing processing is not dependent on a particular OS or platform.

Figure 5:
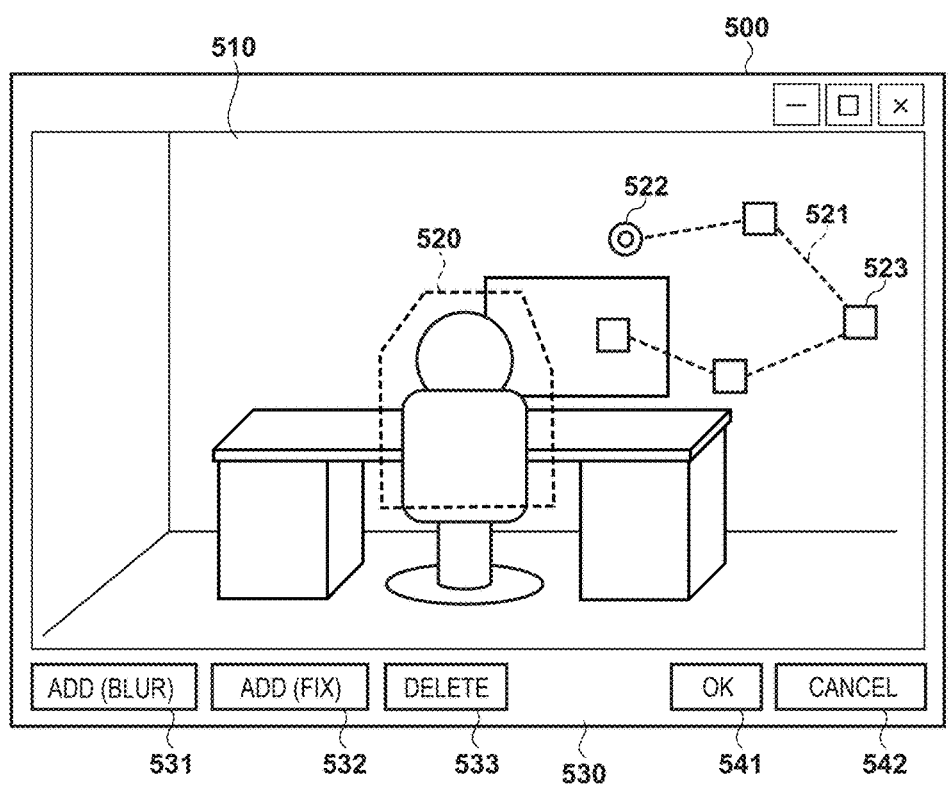
FIG. 5 is a diagram showing an example of a screen for setting a privacy protection area.

FIG. 5 shows an example of a screen for setting a restricted area provided by the parameter setting unit 308 according to the first embodiment. A setting dialog 500 includes an image display portion 510 and a button arrangement portion 530. Any image, such as an initial background image and an input image, can be designated as an image displayed on the image display portion 510 using another setting dialog (not shown). Note that an initial background image is a background image that is generated first by the image obtaining unit 301 since the start of obtainment of a series of images, and may be an image that is obtained first by the image obtaining unit 301.

The user can operate an area designation control 521 by pressing an add button 531 or 532. The area designation control 521 is composed of a start point 522 and a plurality of vertices 523, and the user can designate a polygonal area as a restricted area using them. The start point and vertices can be moved and added by designating on-screen positions using a pointing device, such as a mouse. The polygonal restricted area is confirmed by designating the start point 522 again using a mouse pointer. The result thereof is displayed as a restricted area 520, for example.

In the present embodiment, there are two types of advantageous effects of the restricted area. An advantageous effect of the restricted area that is brought about by the add button 531 is the restriction of an update of a background image in the designated restricted area through application of blur processing to the designated restricted area. This method is the aforementioned method for generating a background mask image 214, and generates the background mask image 214 by, for example, applying the blur processing to a partial image corresponding to the restricted area in an input image. On the other hand, an advantageous effect of the restricted area that is brought about by the add button 532 is the restriction of an update of a background image with the use of an image of the designated restricted area as-is. For example, if the restricted area 520 is designated on an initial background image, a partial image corresponding to the restricted area 520 in the initial background image is used as the background mask image 214.

Pressing a delete button 533 will delete the settings of a selected restricted area. A restricted area is selected by, for example, designating any position within the restricted area using a mouse pointer. Pressing an OK button 541 will store the settings of the restricted area. Pressing a cancel button 542 will end the setting dialog 500 without storing the settings of the restricted area. In this case, the state of the settings prior to the activation of the setting dialog 500 is maintained.

Figure 6:
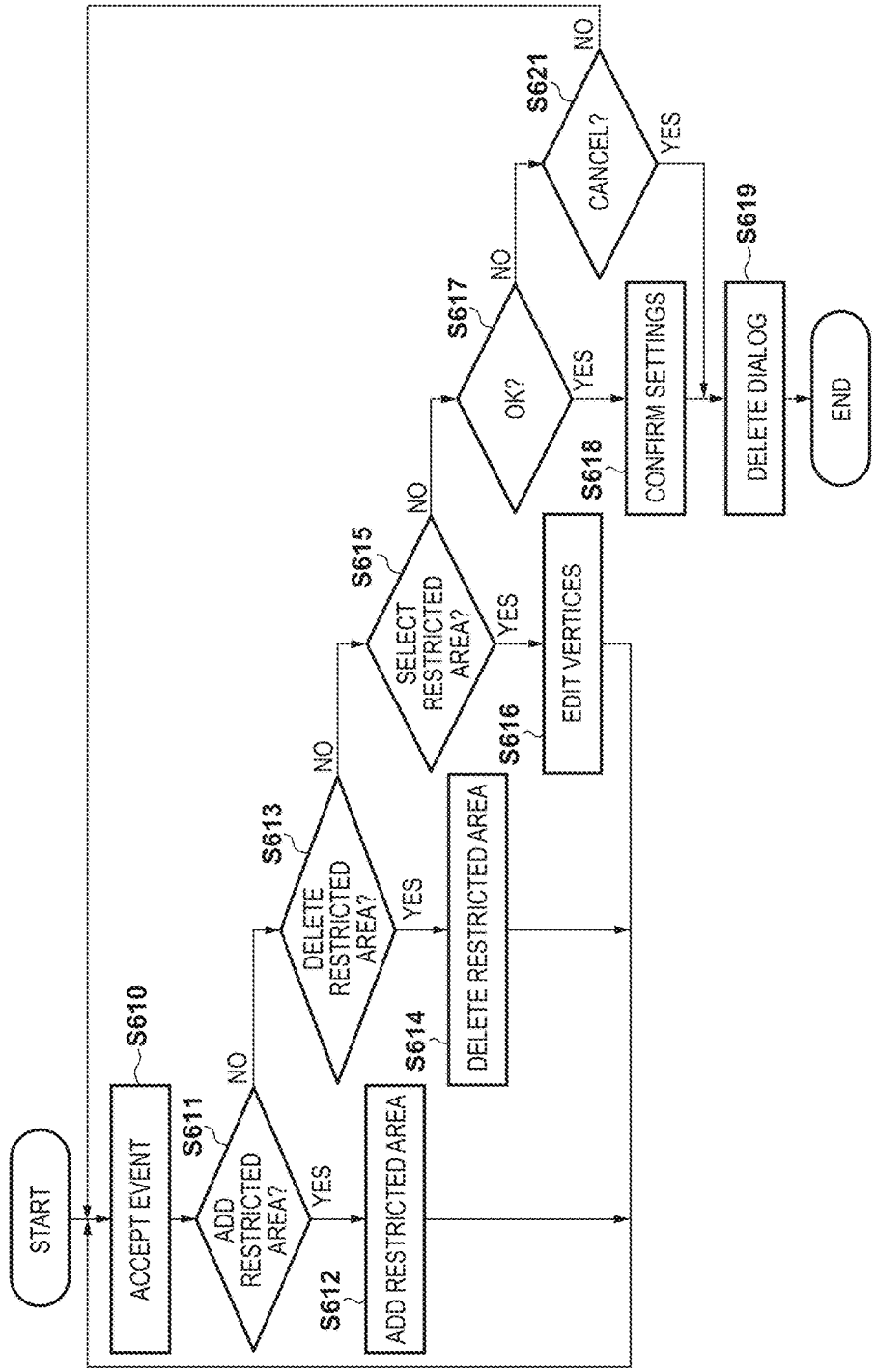
FIG. 6 is a flowchart showing the operations of setting the privacy protection area.

FIG. 6 is a flowchart showing processing related to the setting dialog 500. Once an instruction for activating the setting dialog 500 has been issued, the parameter setting unit 308 performs initialization (not shown) and displays the setting dialog 500. Next, in step S610, the parameter setting unit 308 waits for input of an operation event. Once the operation event has been input (in the present example, once an operation of pressing one of the buttons 531 to 533, 541, and 542 has been performed), the parameter setting unit 308 distinguishes the event.

First, if it is determined that the event is a restricted area addition event in step S611, the parameter setting unit 308 executes processing for adding a restricted area in step S612. This is processing for generating a polygonal area through an operation of pressing the add buttons 531, 532 and a subsequent operation on the area designation control 521. Here, as processes related to mask types (blurring, no processing) are the same, they will be Illustrated collectively.

If the event is not the restricted area addition event, whether the event is a restricted area deletion event is determined in step S613. If it is determined that the event is the restricted area deletion event, the parameter setting unit 308 executes processing for deleting a selected restricted area in step S614. This is processing corresponding to an operation of pressing the delete button 533.

If the event is not the restricted area deletion event, whether the event is a restricted area selection event is determined in step S615. If it is determined that the event is the restricted area selection event, the parameter setting unit 308 edits (moves) the start point 522 and vertices 523 of the area designation control 521 in response to a user's instruction in step S616. The restricted area selection event occurs as a result of designating an existing on-screen restricted area (e.g., the restricted area 520) using a mouse pointer. Note that the restricted area to be deleted in the aforementioned step S614 is, for example, a restricted area that has been selected by the restricted area selection of step S615.

If the event is not the restricted area selection event, whether the event is an OK button pressing event (an event that has occurred as a result of pressing the OK button 541) is determined in step S617. If the event is the OK button pressing event, the parameter setting unit 308 confirms the current settings on the setting dialog 500 in step S618. Then, the parameter setting unit 308 deletes the setting dialog 500 and ends a dialog. If the event is not the OK button pressing event, whether the event is a cancel button pressing event (an event that has occurred as a result of pressing the cancel button 542) is determined in step S621. If the event is the cancel button pressing event, the parameter setting unit 308 ends the dialog without updating the state of the settings in step S619. Processing of step S610 and subsequent steps is repeated if an operation event is input after the completion or during the execution of the processing for adding a restricted area (step S612), the processing for deleting a restricted area (step S614), and the processing for selecting a restricted area (step S616), or if it is determined that the event is the cancel button pressing event in step S621.

According to the above-described first embodiment, in generating a privacy protection image based on background subtraction, a restricted area, in which reflection of an update of a background image based on an input image is restricted, is designated as an area that is always protected when displayed. In this way, for example, a person who is motionless for a long time can be displayed with privacy protection regardless of the result of distinction between a foreground and a background.

<Second Embodiment>

Although the first embodiment has described a configuration in which the user designates a restricted area on the setting dialog 500, a method for setting a restricted area is not limited to this. A second embodiment describes, as another example of the method for setting a restricted area, a configuration that automatically adds a human area as a restricted area.

Figure 7:
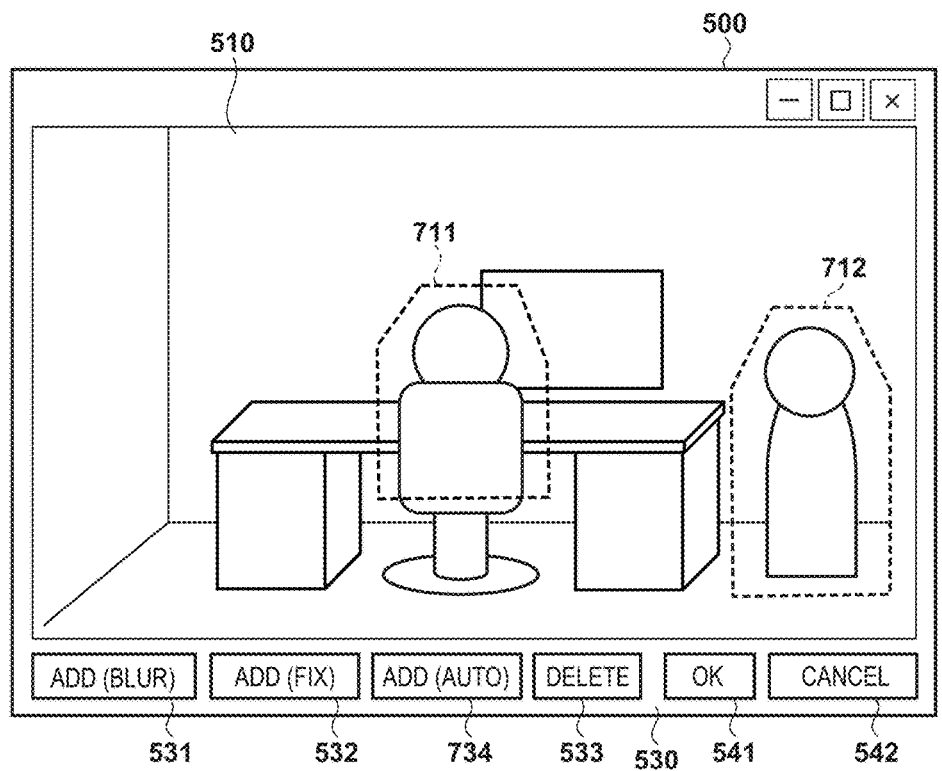
FIG. 7 is a diagram showing an example of a screen for setting a privacy protection area according to a second embodiment.

FIG. 7 shows an example of an initial state of the setting dialog 500 according to the second embodiment. A difference from the first embodiment lies in the provision of an automatic add button 734. If the automatic add button 734 is pressed, human detection processing is executed with respect to an image displayed on the image display portion 510, and detected human areas 711, 712 are displayed as candidate areas. In this state, if the OK button 541 is pressed, the parameter setting unit 308 registers the human area 711 and the human area 712 as restricted areas. Furthermore, the user can delete an unnecessary candidate area. For example, only the human area 711 can be set as a restricted area by designating the human area 712 and pressing the delete button 533. There is no need for the user to specify a restricted area by operating the area designation control 521; this simplifies an operation of setting a restricted area.

Figure 8:
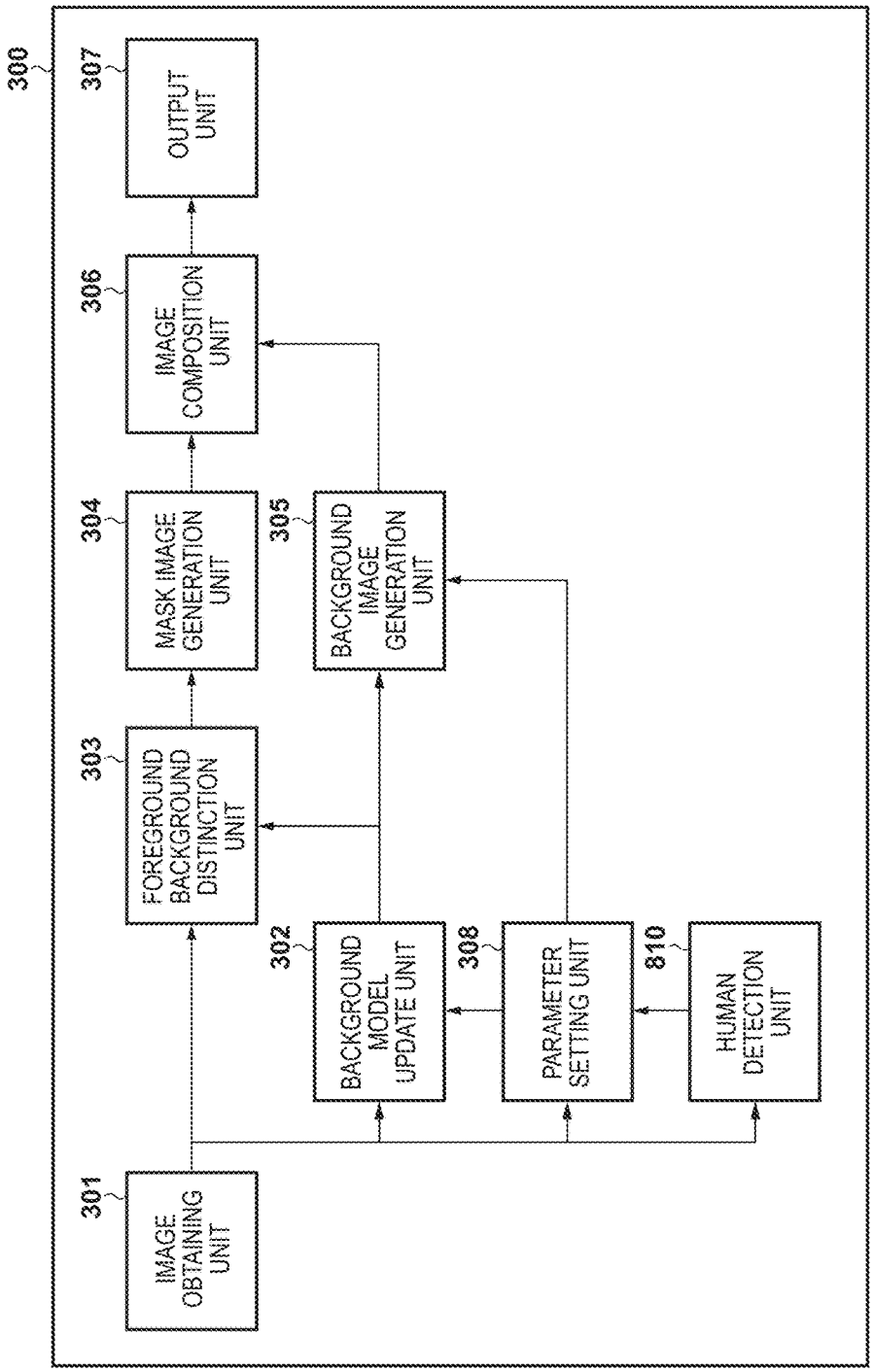
FIG. 8 is a block diagram showing an exemplary functional configuration of a video generation apparatus according to the second embodiment.

FIG. 8 is a block diagram showing an exemplary functional configuration of a video generation apparatus 300 according to the second embodiment. A difference from the first embodiment lies in that a human detection unit 810 is added and a restricted area is set based on the result of the detection thereby.

Figure 9:
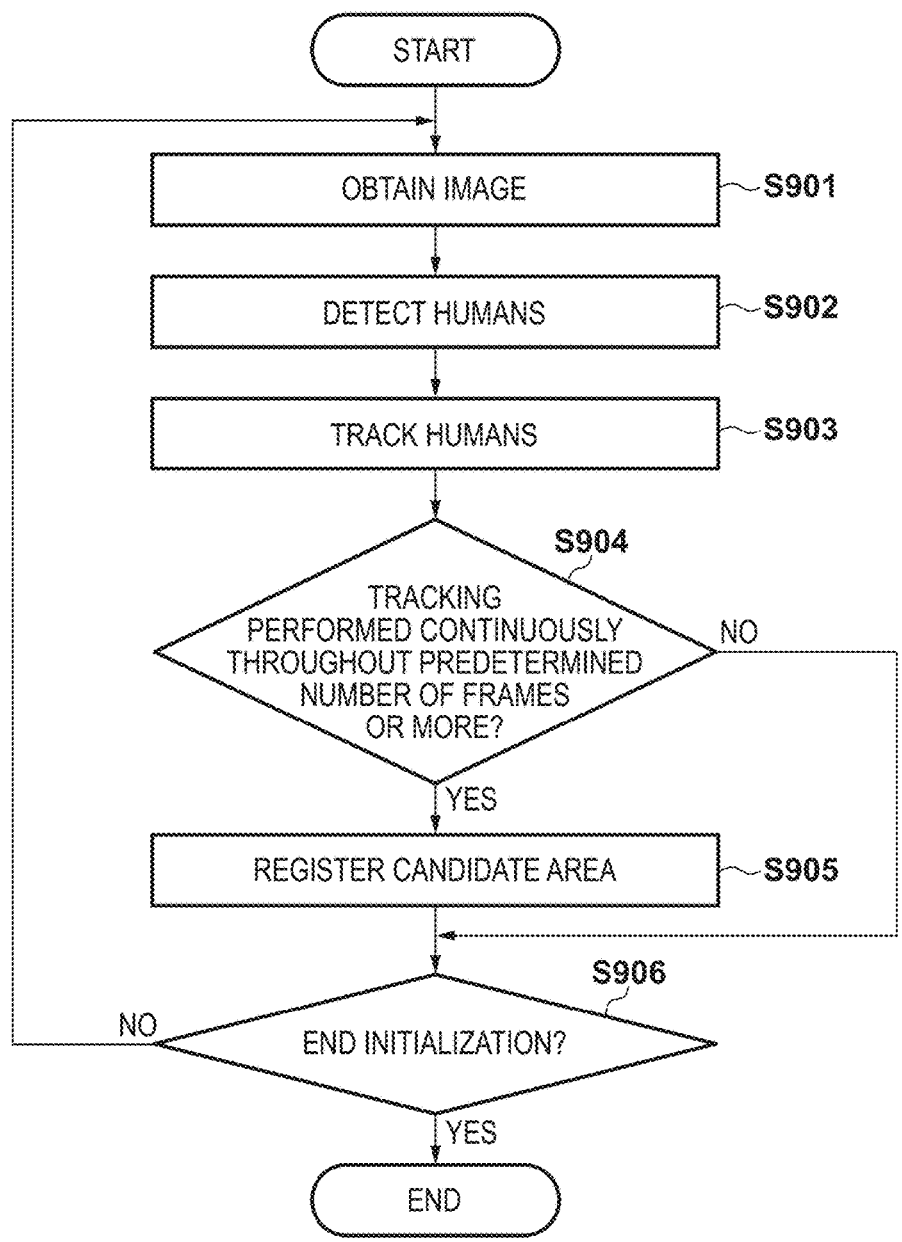
FIG. 9 is a flowchart showing processing for registering an initial mask area based on human detection.

FIG. 9 is a flowchart showing processing for automatically setting a restricted area, which is executed by the human detection unit 610 and the parameter setting unit 308. Once the present processing has been started by pressing the automatic add button 734, the human detection unit 810 obtains an image in step S901. The image is an image displayed on the image display portion 510; here, it is an input image obtained by the image obtaining unit 301. In step S902, the human detection unit 810 detects humans from the image obtained in step S901. Then, in step S903, the human detection unit 810 executes tracking processing with respect to the detected humans. Here, human detection can incorporate a pattern matching method using human images, a method based on feature amounts, a method based on machine learning, and so on, and is not dependent on a particular human detection method. Next, in order to prevent erroneous detection, the human detection unit 810 extracts a human for which tracking has been performed throughout a predetermined number of frames or more in step S904. In step S905, the parameter setting unit 308 registers an area of the extracted human as a candidate area.

In registering a candidate area, the result of the tracking can be checked, and the registration can be limited to a human with a movement amount smaller than a predetermined value. As a result, in FIG. 7 for example, a periphery of the human area 711 corresponding to a motionless person can be automatically registered as a mask area, and the human area 712 corresponding to a moving person can be excluded from a target.

As described above, according to the second embodiment, in setting a background image to be displayed in a privacy protection image, an area with a high privacy protection effect can be easily set as a restricted area.

<Third Embodiment>

In the first and second embodiments, privacy is protected by using an image obtained by applying blur processing or mosaic processing to an image of a restricted area as a background mask image, or by using a partial image corresponding to a restricted area in an initial background image as a background mask image. In the third embodiment, privacy is protected in a restricted area by setting a longer backgroundization time for a restricted area than for other areas.

That is to say, in the third embodiment, the privacy protection effect is made continuous by setting different backgroundization times for different areas. For example, an area in which a motionless person does not currently exist within an image but could possibly exist in the future, such as an area around a chair, is set as a mask area, and a longer backgroundization time is set for the mask area than for surrounding areas. As a period from when a person sits on the chair until reflection of the person in a background image as a background is longer that in the surrounding areas, the privacy protection effect continues for a long time.

A functional configuration according to the third embodiment is similar to that according to the first embodiment (FIG. 3). Furthermore, a setting dialog is similar to that according to the first embodiment (FIG. 5). The following describes processing for an area that has been set as a restricted area. As stated earlier, whereas the first and second embodiments protect privacy by processing a background image for display (through overlap of a background mask image), the third embodiment protects privacy by changing a backgroundization time of a background model on an are-by-area basis.

A backgroundization time will now be explained. According to a background subtraction method, feature amounts are extracted from an input image, and weighted and mixed with a background model. At this time, a period until reflection in a background image can be extended by increasing a contribution rate of an existing background. Therefore, a backgroundization time can be defined as a contribution rate of an input image with respect to a background model. Here, a completely fixed background is selected by making the contribution rate zero.

Figure 10:
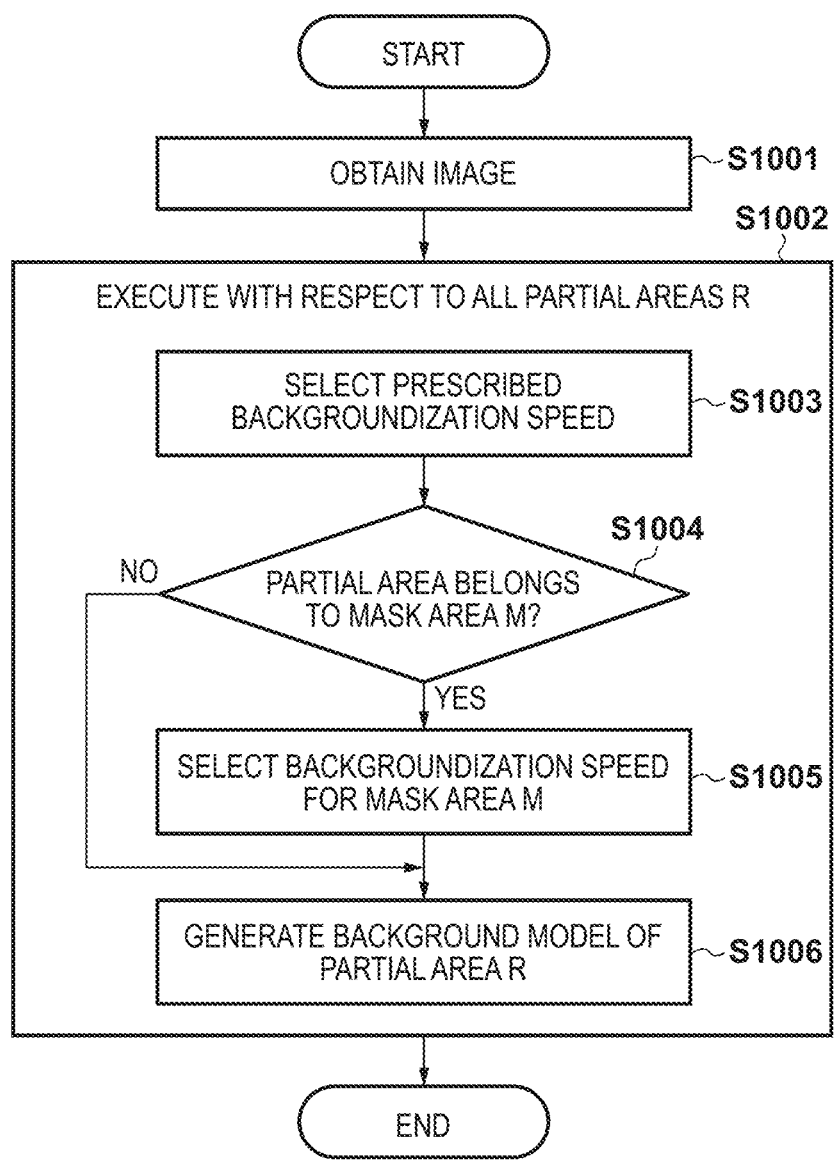
FIG. 10 is a flowchart showing processing for controlling the speed of reflection in a background image on a per-mask region basis.

FIG. 10 is a flowchart showing background subtraction processing executed by the background model update unit 302 according to the third embodiment. In step S1001, the background model update unit 302 obtains an input image. In processing of next step S1002, steps S1003 to S1006 are executed with respect to all partial areas within the image. In step S1003, the background model update unit 302 applies (selects) a prescribed backgroundization time as an initial value. Next, in step S1004, the background model update unit 302 distinguishes whether a target partial area belongs to a restricted area. For example, if 50% or more of the partial area is included in the restricted area, it is determined that this partial area belongs to the restricted area. If the target partial area belongs to the restricted area, the background model update unit 302 applies (selects) a backgroundization time for the restricted area (a backgroundization time longer than that for other areas) in step S1005. In step S1006, a background. model of this partial area is updated based on the set backgroundization time. In this way, for the partial area that belongs to the restricted area, a backgroundization time longer than that for other areas is applied.

As described above, according to the third embodiment, a long backgroundization time can be set for a restricted area targeted for privacy protection. This slows down backgroundization of a person who is motionless for a long time in the restricted area, and as a result, privacy can be protected.

(Exemplary Modifications)

Although a longer backgroundization time is set for a restricted area set by the user than for other areas in the third embodiment, it goes without saying that a restricted area may be set based on the result of human detection as in the second embodiment. In this case, an area in which a human was detected over a period longer than a predetermined threshold is used as a restricted area, and a longer backgroundization time is set therefor than for other areas. Furthermore, although a background mask candidate area based on human detection is obtained from a current video in the second embodiment, no limitation is intended in this regard. A restricted area may be set by detecting a human from a recorded video of the past. In this case, in the recorded video of the past, an area in which a cumulative value of periods in which a human was detected exceeds a predetermined threshold may be set as a restricted area. In addition, in the third embodiment, a longer backgroundization time may be set for a restricted area that has been set in the foregoing manner than for other areas. In this was, reflection of an image of a person in a background image is restricted in an area in which a human was detected frequently in the past, and more accurate privacy protection can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, as optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040922, filed Mar. 3, 2017, which is hereby incorporated by reference herein in its entirety.

What is claimed is:

1. An image generation apparatus, comprising:
a processor executing instructions stored in a memory that, when executed by the processor, cause the processor to function as:
a generation unit that generates a output image in which a foreground mask image overlaps a background image, the foreground mask image having been generated based on a moving object included in an input image, which is detected by background subtraction method for the input image;
an update unit that executes backgroundization by update processing for updating at least a partial area within the background image based on the input image so that the partial area which stays motionless over a predetermined backgroundization time is reflected in the background image;
a setting unit configured to set a restricted area in which reflection of the backgroundization is restricted; and
an applying unit configured to apply at least on of blur processing and mosaic processing to the restricted area set in the background image, or to apply a partial image of an initial background image corresponding to the restricted area, as a partial image of the background image for the output image so as to mask an object in restricted area even if the object stays motionless over the predetermined backgroundization time.

2. The apparatus according to claim 1 wherein the setting unit sets the restricted area based on a user operation.

3. The apparatus according to claim 1 wherein the instructions further causes the computer to function as a detection unit that detects a human area included in the input image, and
wherein the setting unit sets a human area detected by the detection unit as the restricted area.

4. The apparatus according to claim 1, wherein the input image is a streaming image being shot by an image capturing apparatus.

5. The apparatus according to claim 1, wherein the input image is an image shot and stored by an image capturing apparatus in the past.

6. An image generation apparatus, comprising:
a processor executing instructions stored in a memory that, when executed by the processor, cause the processor to function as:
a generation unit that generates an output image in which a foreground mask image overlaps a background image, the foreground mask image having been generated based on a moving object included in an input image, which is detected by background subtraction method for the input image;
an update unit that executes backgroundization by update processing for updating at least a partial area within the background image based on the input image so that the partial area which stays motionless over a predetermined backgroundization time is reflected in the background image;
a setting unit configured to set a restricted area in which reflection of the backgroundization is restricted; and
an applying unit configured to apply, to the restricted area set in the background image, a first backgroundization time longer than a second backgroundization time applied to other areas in the background image, so as to keep an object which stays motionless in the restricted area masked over a period longer than an object in the other areas.

7. The apparatus according to claim 6, wherein the setting unit sets the restricted area based on a user operation.

8. The apparatus according to claim 6, wherein the instructions further causes the computer to function as a detection unit that detects a human area included in the input image, and
wherein the setting unit sets a human area detected by the detection unit as the restricted area.

9. The apparatus according to claim 6, wherein
the input image is a streaming image being shot by an image capturing apparatus.

10. The apparatus according to claim 6, wherein
the input image is an image shot and stored by an image capturing apparatus in the past.

11. A control method for an image generation apparatus, the control method comprising:
generating an output image in which a foreground mask image overlaps a background image, the foreground mask image having been generated based on a moving object included in an input image, which is detected by background subtraction method for the input image;
executing backgroundization by update processing for updating at least a partial area within the background image based on the input image so that the partial area which stays motionless over a predetermined backgroundization time is reflected in the background image;
setting a restricted area in which reflection of the backgroundization is restricted; and
applying at least one of blur processing and mosaic processing to the restricted area set in the background image, or applying a partial image of an initial background image corresponding to the restricted area, as a partial image of the background image for the output image so as to mask an object in the restricted area even if the object stays motionless over the predetermined backgroundization time.

12. A non-transit computer readable storage medium having stored therein a program for causing a computer to execute a control method for an image generation apparatus, the control method comprising:
generating an output image in which a foreground mask image overlaps a background image, the foreground mask image having been generated based on a moving object included in an input image, which is detected by background subtraction method for the input image;
executing backgroundization by update processing for updating at least a partial area within the background image based on the input image so that the partial area which stays motionless over a predetermined backgroundization time is reflected in the background image;
setting a restricted area in which reflection of the backgroundization is restricted; and
applying at least one of blur processing and mosaic processing to the restricted area set in the background image, or applying a partial image of an initial background image corresponding to the restricted area, as a partial image of the background image for the output image so as to mask an object in the restricted area even if object stays motionless over the predetermined backgroundization time.

13. A control method for an image generation apparatus, the control method comprising:
generating an output image in which a foreground mask image overlaps a background image, the foreground mask image having been generated based on a moving object included in an input image, which is detected by background subtraction method for the input image;
executing backgroundization by update processing for updating at least a partial area within the background image based on the input image so that the partial area which stays motionless over a predetermined backgroundization time is reflected in the background image;
setting a restricted area which reflection backgroundization is restricted; and
applying, to the restricted area set in the background image, a first backgroundization time longer than a second backgroundization time applied to other areas in the background image, so as to keep an object which stays motionless in the restricted area masked over a period longer than an object in the other areas.

14. A non-transitory computer readable storage medium having stored therein a program for causing a computer to execute a control method for an image generation apparatus, the control method comprising:
generating an output image in which a foreground mask image overlaps a background image, the foreground mask image having been generated based on a moving object included in an input image, which is detected by background subtraction method for the input image;
executing backgroundization by update processing for updating least a partial area within the background image based on the input image so that the partial area which stays motionless over a predetermined backgroundization time is reflected in the backgroundization image;
setting a restricted area in which reflection of the backgroundization is restricted; and
applying, to the restricted area set in the background image, a first backgroundization time longer than a second backgroundization time applied to other areas in the background image, so as to keep an object which stays motionless in the restricted area masked over a period longer than an object in the other areas.

15. An image generation apparatus, comprising:
a processor executing instructions stored in a memory that, when executed by the processor, cause the processor to function as:
an obtaining unit configured to obtain an input image captured by an imaging unit;
a first generation unit configured to generate a foreground mask image for obscuring an object detected from the input image;
an update unit configured to execute backgroundization by update processing for updating at least a partial area within a background image based on the input image so that the partial area which stays motionless over a predetermined backgroundization time is reflected in the background image; and
a second generation unit configured to generate an output image by superimposing the foreground mask image on the background image and by performing image processing for obscuring a restricted area set in background image, so as to obscure an object in the restricted area even if the object stays motionless over the predetermined backgroundization.

16. The apparatus according to claim 15,
wherein the second generation unit generates the output image by superimposing the foreground mask image on the background image and by performing at least one of blur processing and mosaic processing to the restricted area in the background image.

17. The apparatus according to claim 15,
wherein the second generation unit generates the output image by superimposing a partial image of an initial background image corresponding to the restricted area and the foreground mask image on the background image.

18. The apparatus according to claim 15, further comprising
a setting unit configured to set the restricted area in which reflection of the backgroundization is restricted.

19. The apparatus according to claim 18,
wherein the setting unit sets the restricted area based on a user operation.

20. A control method for an image generation apparatus, the control method comprising:
obtaining an input image captured by an imaging unit;
generating a foreground mask image for obscuring an object detected from the input image;
executing backgroundization by update processing for updating at least a partial area within a background image based on the input image so that the partial area which stays motionless over a predetermined backgroundization time is reflected in the background image; and
generating an output image by superimposing the foreground mask image on the background image and by performing image processing for obscuring a restricted area set in the background image, so as to obscure an object in the restricted area even if the object stays motionless over the predetermined backgroundization time.

21. The control method according to claim 20,
wherein the output image is generated by superimposing the foreground mask image on the background image and by performing at least one of blue processing and mosaic processing to the restricted area set in the background image.

22. The control method according to claim 20,
wherein the output image is generated by superimposing a partial image of an initial background image corresponding to the restricted area and the foreground mask image on the background image.

23. A non-transitory computer readable storage medium having stored therein a program for causing a computer to execute a control method for an image generation apparatus, the control method comprising:
obtaining an input image captured by an imaging unit;
generating a foreground mask image for obscuring an object detected from the input image;
executing backgroundization by update processing for updating at least a partial area within a background image based on the input image so that the partial area which stays motionless over a predetermined backgroundization time is reflected in the background image; and
generating an output image by superimposing the foreground mask image on the background image and by performing image processing for obscuring a restricted area set in the background image, so as to obscure an object in the restricted area even if the object stays motionless over the predetermined backgroundization time.

* * * * *